United States Patent [19]

Nakazawa

[11] Patent Number: 5,463,700
[45] Date of Patent: Oct. 31, 1995

[54] IMAGE PROCESSING APPARATUS WITH COMPRESSION ERROR DETECTOR

[75] Inventor: Tamotsu Nakazawa, Yokohama, Japan

[73] Assignee: Canon Kabushiki Kaisha, Tokyo, Japan

[21] Appl. No.: 267,308

[22] Filed: Jun. 29, 1994

Related U.S. Application Data

[63] Continuation of Ser. No. 161,870, Dec. 6, 1993, abandoned, which is a continuation of Ser. No. 65,028, May 24, 1993, abandoned, which is a continuation of Ser. No. 860,602, Mar. 30, 1992, abandoned, which is a continuation of Ser. No. 560,291, Jul. 27, 1990, abandoned, which is a continuation of Ser. No. 138,964, Dec. 29, 1987, abandoned.

[30] Foreign Application Priority Data

Jan. 14, 1987 [JP] Japan ................................. 62-6355
Jun. 10, 1987 [JP] Japan ............................. 62-144960
Jun. 10, 1987 [JP] Japan ............................. 62-144961

[51] Int. Cl.⁶ ........................ G06K 9/36; G01R 31/28; G06F 11/00
[52] U.S. Cl. ...................... 382/232; 382/309; 371/24; 358/405; 358/406
[58] Field of Search ................. 382/56, 57; 371/24, 371/25.1, 27; 358/405, 406

[56] References Cited

U.S. PATENT DOCUMENTS

| | | | |
|---|---|---|---|
| 3,944,975 | 3/1976 | Yasumoto et al. | 371/24 |
| 4,153,916 | 5/1979 | Mina et al. | 358/406 |
| 4,257,031 | 3/1981 | Kirner et al. | 371/24 |
| 4,380,068 | 4/1983 | de Couasnon | 371/24 |
| 4,524,444 | 6/1985 | Efron et al. | 371/24 |
| 4,633,326 | 12/1986 | Endoh et al. | 358/406 |
| 4,695,895 | 9/1987 | Naga Shima | 358/280 |
| 4,750,181 | 6/1988 | McDonald et al. | 371/71 |
| 4,779,106 | 10/1988 | Mills | 358/406 |

FOREIGN PATENT DOCUMENTS

| | | | |
|---|---|---|---|
| 57-25769 | 10/1982 | Japan | 358/405 |
| 58-111486 | 2/1983 | Japan | 358/405 |
| 59-54378 | 3/1984 | Japan | |

*Primary Examiner*—Yon J. Couso
*Attorney, Agent, or Firm*—Fitzpatrick, Cella, Harper & Scinto

[57] ABSTRACT

An image processing apparatus includes a reader for reading image data representing an original image, a compression circuit for compressing the image data read by the reader, and an MPU for causing the compression circuit to compress specific data before image data from the reader is compressed and for determining if a compression operation is normal. The apparatus also includes an expansion circuit for expanding the compressed data from the compression circuit. The MPU compares the specific data with expanded data obtained by expanding, by the expansion circuit, the compressed data obtained by compressing the specific data.

41 Claims, 9 Drawing Sheets

IMAGE PROCESSING APPARATUS WITH COMPRESSION ERROR DETECTOR

This application is a continuation of application Ser. No. 08/161,870, filed Dec. 6, 1993, now abandoned which was a continuation of application Ser. No. 08/065,028, filed May 24, 1993, now abandoned which was a continuation of application Ser. No. 07/860,602, filed Mar. 30, 1992, now abandoned which was a continuation of application Ser. No. 07/560,291, filed Jul. 27, 1990, now abandoned which was a continuation of application Ser. No. 07/138,964, filed Dec. 29, 1987, now abandoned.

BACKGROUND OF THE INVENTION

1. Field of the Invention

The present invention relates to an image processing apparatus for compressing and processing image data for a facsimile system or an electronic file system.

2. Description of the Related Art

In a conventional facsimile system or electronic file system, image information is compressed in order to improve transmission efficiency and storage efficiency, and the compressed image information is transmitted and stored.

Typical compression methods are a modified Huffman (MH) method and a modified READ (MR) method. In these methods even if an error occurs in compressed data, only the data portion causing an error is lost, and the error does not influence other data (the entire image), but this is at the cost of compression efficiency.

Recently, with the use of high-quality digital transmission paths or error-free optical disc units, the probability of error generation in compressed data tends to be decreased. With this tendency, another compression method, e.g., a modified modified READ (MMR) method capable of achieving a higher compression ratio than the MH or MR method is often employed.

In the high-compression MMR method, compression at a high ratio 1.5 to 3.0 times that obtained with the MH method can be achieved. However, if an error occurs in the compressed data, the entire image following the data portion containing the error is influenced by the error, and hence, it is impossible to reproduce the image properly.

In another proposal, error-check-and-correct (ECC) data is added to data compressed by the MMR method to realize error-free data.

However, if a compression circuit malfunctions due to high-compression processing, erroneous compression operation is performed, and erroneously compressed data is transmitted and stored, then the compression operation error can be detected only after the compressed data is expanded.

Therefore, when a long time interval is present between image data compression processing and expansion processing of compressed image data like in a facsimile system having a storage function or an image electronic file system, if a compression error is detected upon expansion processing, original data has already been deleted, and information may be lost.

SUMMARY OF THE INVENTION

The present invention has been made in consideration of the above situation and has as its object to provide an image processing apparatus for compressing image data and transmitting or storing compressed image data, which can reliably execute image data compression operation.

It is another object of the present invention to provide an image processing apparatus which can prevent erroneously processed data from being transmitted or stored when erroneous compression operation is performed.

It is still another object of the present invention to provide an image processing apparatus which can check whether or not a compression operation can be normally executed before image data is compressed and compressed image data is transmitted or stored.

It is still another object of the present invention to provide an image processing apparatus which can detect whether or not a compression operation has been or is being normally performed simultaneously with or immediately after image data compression processing.

The above and other objects, features and advantages of the present invention will be apparent from the following description of the preferred embodiments taken in conjunction with the accompanying drawings.

DETAILED DESCRIPTION OF THE PREFERRED EMBODIMENTS

A preferred embodiment of the present invention will be described hereinafter.

Figure 1:
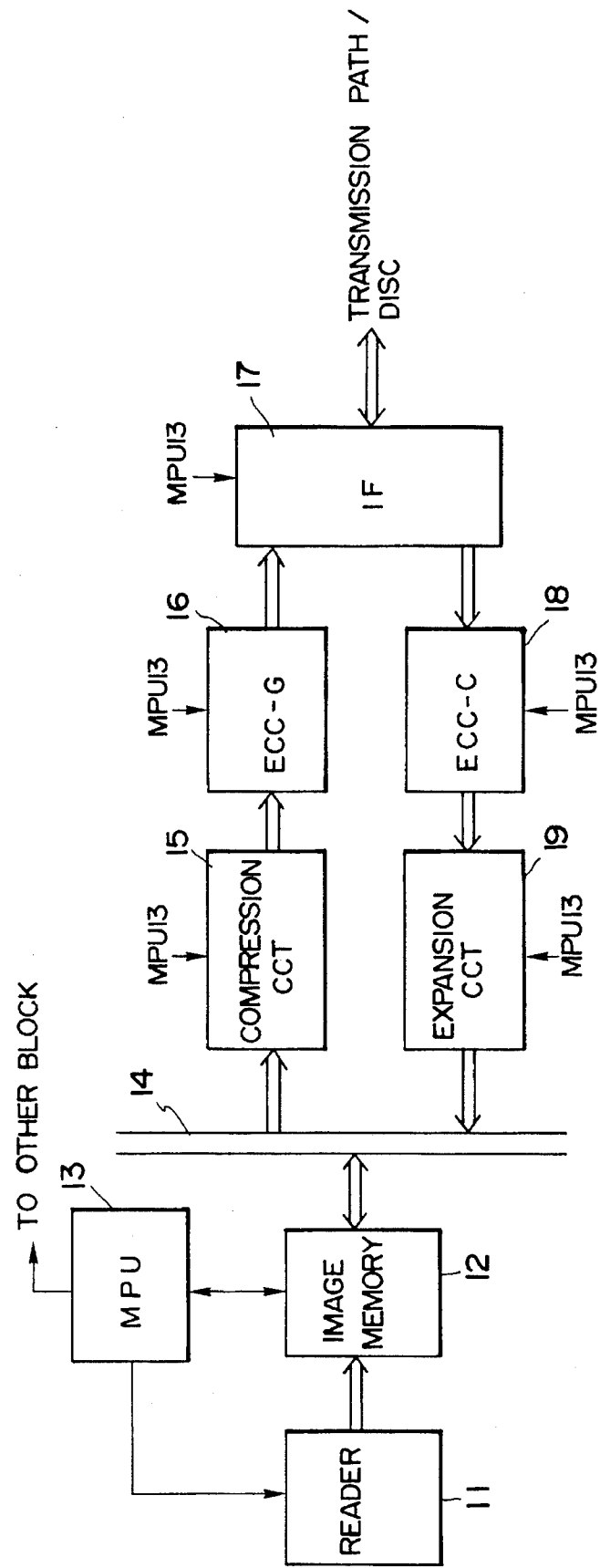
FIGS. 1, 2, and 3 are block diagrams respectively showing arrangements of first to third embodiments of an image processing system to which the present invention is applied.

FIG. 1 shows an arrangement of a first embodiment of an image processing system to which the present invention is applied. In FIG. 1, a reader 11 photoelectrically reads an original image using an image sensor such as a CCD, and outputs image data representing the original image. An image memory 12 comprises a semiconductor random-access memory (RAM) and stores the image data output from the reader 11, data input from a bus 14, and data output from an MPU (microprocessor) 13. The MPU 13 controls the entire image processing system. The bus 14 can perform multiplex-operation. A compression circuit 15 compresses image data in accordance with the MMR method. An ECC generator 16 adds ECC data, as a countermeasure against an error, to compressed data. An interface 17 transmits compressed data to external apparatuses such as a transmission apparatus (facsimile) and a storage apparatus (disc), and fetches the compressed data from the external apparatuses. An ECC check circuit 18 corrects an error based on the ECC data added to the compressed data. An expansion circuit 19 expands data compressed in accordance with the MMR method.

In FIG. 1, a printer for recording an image on a recording medium based on image data expanded by the expansion circuit 19, and a display for displaying the image are connected to the bus 14, as needed.

Figure 4:
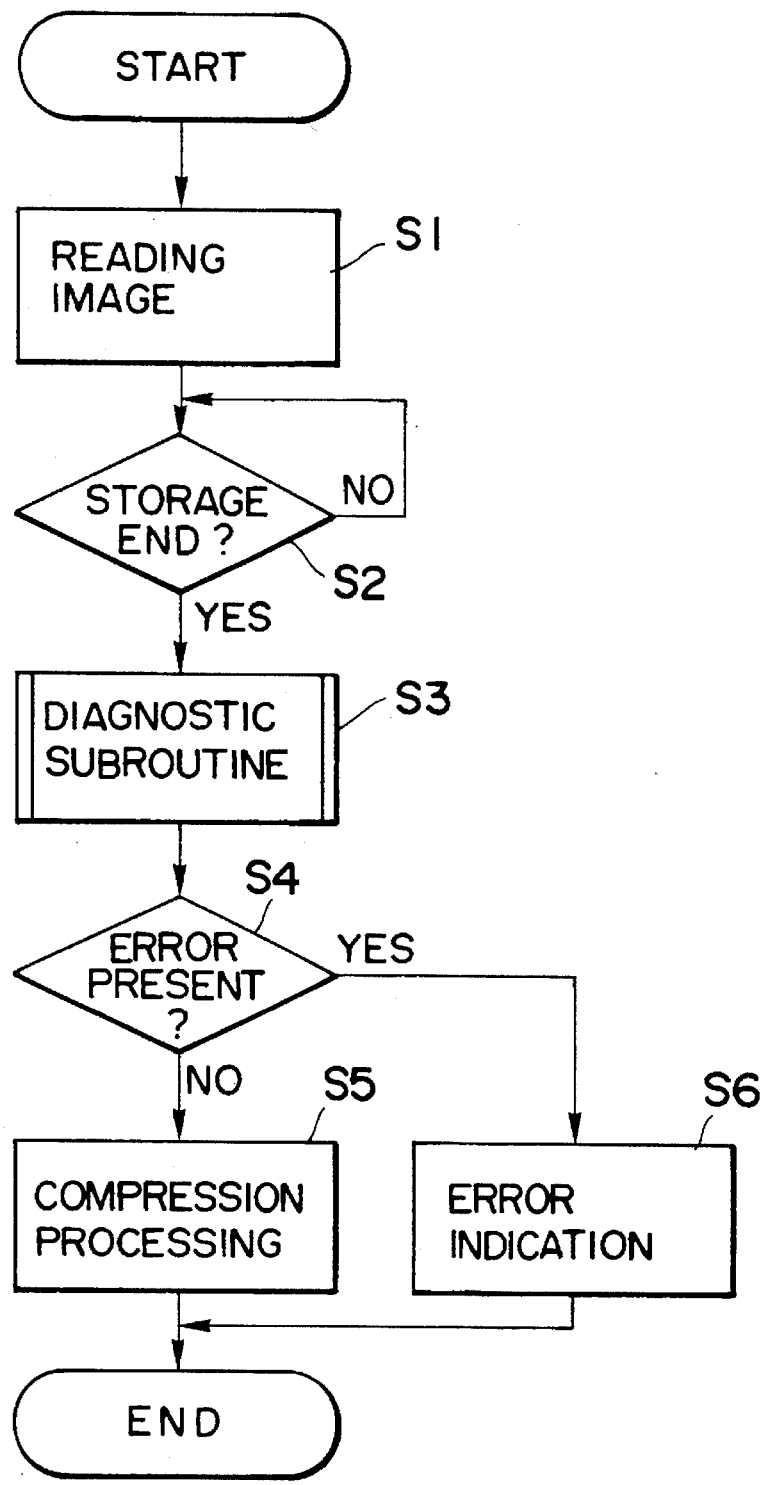
FIG. 4 is a flow chart showing an operation sequence of an MPU 13.

FIG. 4 is a flow chart showing an operation sequence of the MPU 13 in the image processing system shown in FIG. 1. A control program of this flow chart is prestored in an internal memory of the MPU 13.

The operation of the image processing system shown in FIG. 1 will be described with reference to FIG. 4.

The flow chart shown in FIG. 4 shows the operation sequence wherein image data representing an original image and read by the reader 11 is compressed by the compression circuit 15 in accordance with the MMR method, and the compressed data is transmitted to the external apparatuses through the ECC generator 16 and the interface 17. In step S1, an original image is read by the reader 11. The image data output from the reader 11 is temporarily stored in an image area of the image memory 12. If it is determined in step S2 that the storage of the image data in the image memory 12 is completed, a diagnostic subroutine (to be described later) is called in step S3, and the diagnostic operation is executed.

In the diagnostic subroutine, it is diagnosed prior to compression of the image data whether or not the compression circuit 15 can be normally operated. If a normal compression operation is performed, an error flag is reset. However, if a normal compression operation is not performed, the error flag is set. After execution of the diagnostic subroutine, it is checked in step S4 whether or not the error flag is reset to determine if the compression operation is normal. If NO in step S4, the flow advances to step S5, and the image data stored in the image memory 12 is read out, and is sent to the compression circuit 15 through the bus 14. The image data is compressed in accordance with the MMR method, and the compressed image data is transmitted to the external apparatuses through the ECC generator 16 and the interface 17. However, if YES in step S4, i.e., if it is determined (or "judged", used throughout as a synonym therefor) that the compression operation is abnormal, the flow advances to step S6, and no compression operation of the image data is performed. Then, a message indicating that the compression operation cannot be normally performed is displayed on a display (not shown) provided in, e.g., an operation unit of the reader.

In this manner, before the compression processing of the image data output from the reader 11, it is checked whether or not the compression operation can be normally executed. If it is determined that the compression operation can be normally executed, image data compression and transmission processing is performed. Therefore, erroneously compressed image data can be prevented from being transmitted to a remote location or being registered in an electronic file.

Figure 5:
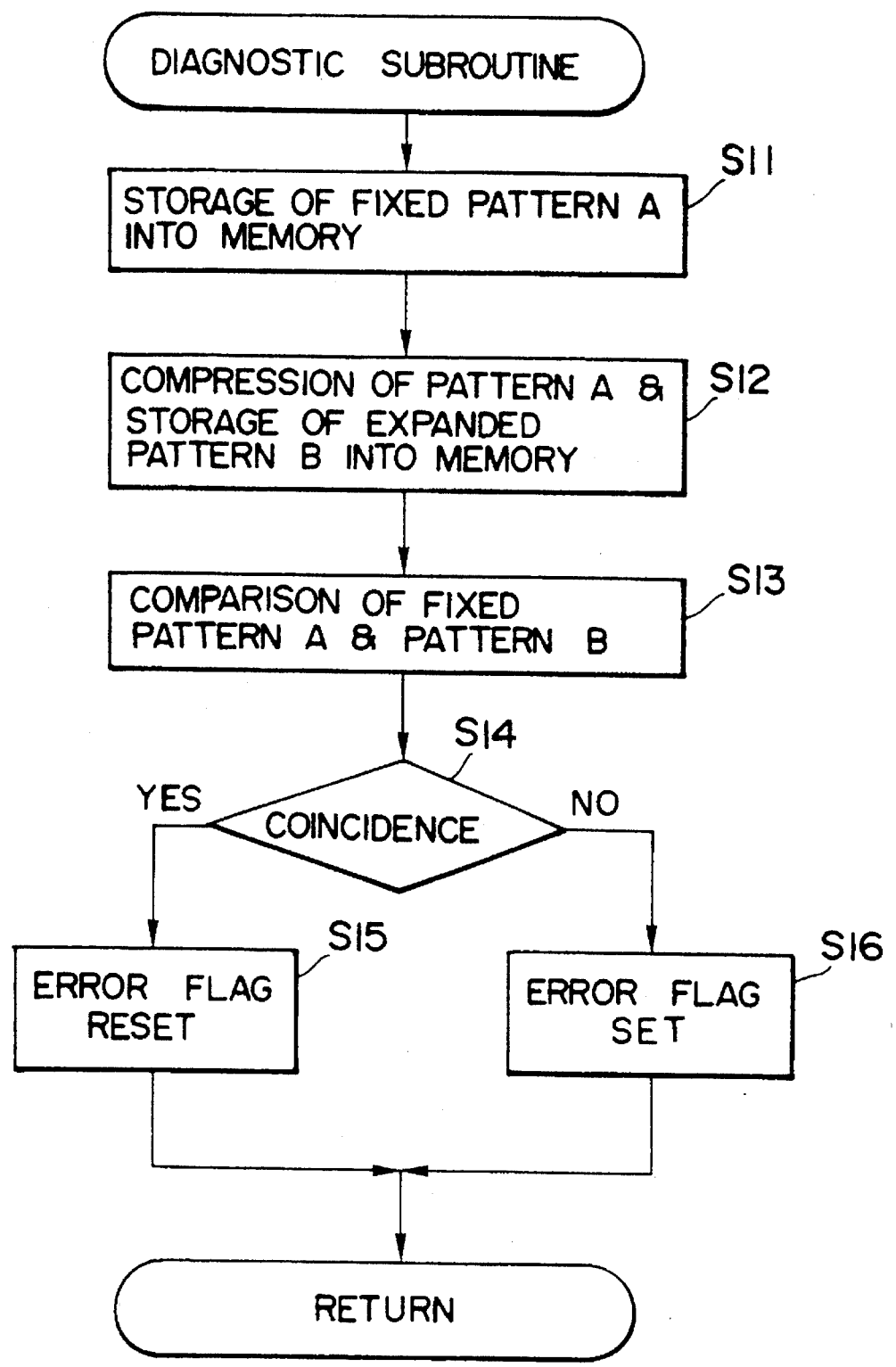
FIGS. 5, 6, and 7 are flow charts showing diagnostic subroutines in the first to third embodiments.

FIG. 5 is a flow chart showing in detail the diagnostic subroutine in step S3 in the flow chart of FIG. 4. The control program of this flow chart is also prestored in the internal memory of the MPU 13.

The diagnostic operation of the compression operation in the image processing system shown in FIG. 1 will be described with reference to FIG. 5.

When storage of image data supplied from the reader 11 to the image memory 12 is completed, the diagnostic subroutine is called. In step S11, a fixed pattern A preset in the MPU 13 is stored in a first diagnostic area of the image memory 12.

The pattern A serves as a test pattern for testing whether or not the compression circuit 15 can normally execute the compression operation. In this embodiment, since the compression circuit 15 performs a two-dimensional compression operation based on the MMR method, the pattern A comprises a two-dimensional test pattern, i.e., image data of at least two lines. The test pattern is preferably image data capable of obtaining compression codes of horizontal mode, pass mode, and vertical mode from the compression circuit 15. With this pattern, it can be tested whether or not the compression circuit 15 can normally execute the compression operation in all the coding modes of the MMR method.

In this embodiment, the compression circuit 15 is based on the MMR method. Therefore, the above-mentioned image data is used as the fixed pattern A. However, if the compression circuit 15 executes a compression operation based on another method, e.g., the MH or MR method, the volume and content of the data in fixed pattern A are changed to be suitable for the compression method to be executed.

After the fixed pattern A is stored in the first storage area of the image memory 12, the fixed pattern A is read out from the image memory 12 and is supplied to the compression circuit 15 through the bus 14 in step S12. Then, the fixed pattern A is compressed.

Compressed data CA obtained by compressing the fixed pattern A is supplied to the interface 17 through the ECC generator 16. In this case, the interface 17 does not transmit the compressed data CA input from the ECC generator 16 to the external apparatuses under the control of the MPU 13, but supplies it to the ECC check circuit 18. The compressed data CA is supplied to the expansion circuit 19 through the ECC check circuit 18, and is expanded. A pattern B obtained by expanding the compressed data CA by the expansion circuit 19 is stored in a second diagnostic area of the image memory 12 through the bus 14.

Note that as described above, the bus 14 can execute a multiplex-operation, and hence can execute transmission of the fixed pattern A from the image memory 12 to the compression circuit 15 and transmission of the pattern B from the expansion circuit 19 to the image memory 12 within an identical period in a time-divisional multiplex manner. If the bus 14 is not used as the multiplex bus, a buffer circuit is provided to the transmission path from the compression circuit 15 to the expansion circuit 19. After the fixed pattern A is read out from the image memory 12 onto the bus 14, the output of the pattern B from the expansion circuit 19 onto the bus 14 may be executed.

If storage of the pattern B obtained by expansion processing of the expansion circuit 19 to the image memory 12 is completed, the fixed pattern A stored in the first diagnostic area of the image memory 12 is compared with the pattern B stored in the second diagnostic area. If a coincidence therebetween is established, it can be determined that an image data processing route including the compression circuit 15 is normally operated. However, if the fixed pattern A and the pattern B do not coincide with each other, it can be determined that the image data processing route including the compression circuit 15 is not being normally operated. Therefore, the comparison operation allows a check as to whether the compression circuit 15 is normally operated.

The comparison operation between the fixed pattern A and the pattern B is performed as follows. The MPU 13 exclusive-ORs corresponding bits of the patterns A and B, and when the exclusive ORs for all the bits are all "0"s, it is determined that the patterns A and B coincide with each other. However, when the exclusive OR for at least one bit becomes "1" it is determined that the patterns A and B do not coincide with each other.

After the comparison between the patterns A and B is made in step S13, coincidence or noncoincidence is determined in step S14. If coincidence is established, the error flag is reset in step S15 since the compression circuit 15 is normal. However, if noncoincidence is established, the error flag is set in step S16 since the compression circuit 15 may be abnormal. The diagnostic subroutine is ended, and control returns to the flow chart shown in FIG. 4.

As described above, with the diagnostic subroutine in FIG. 5, it can be determined whether or not the compression circuit 15 is abnormal, and the error flag is set or reset in accordance with the determination result. Therefore, in step S4 in the flow chart of FIG. 4, the set/reset state of the error flag is checked to determine whether the compression of image data is executed using the compression circuit 15 or no compression operation is executed and a message indicating that the normal operation cannot be executed is displayed.

According to the arrangement of this embodiment as described above, prior to compression processing of image data generated from the reader 11, it is diagnosed if the compression operation is normally performed. If the compression operation may not be normally executed, image data compression and transmission are prevented. Therefore, erroneously compressed image data is prevented from being transmitted or stored.

In the arrangement of the first embodiment shown in FIG. 1, the diagnostic operation is executed for the processing route consisting of the compression circuit 15, the ECC generator 16, the interface 17, the ECC check circuit 18, and the expansion circuit 19. Therefore, even if the compression circuit 15 is normally operated, if any of the ECC generator 16, the interface 17, the ECC check circuit 18, and the expansion circuit 19 is abnormal, it is determined that the compression processing may be abnormal. That is, even if the ECC check circuit 18 or the expansion circuit 19 which is not related to the compression/expansion of the image data from the reader 11 is abnormal, image data compression/expansion cannot be executed, resulting in decrease in utilization efficiency of the system.

An arrangement of the second embodiment free from the above drawback will be described below.

Figure 2:
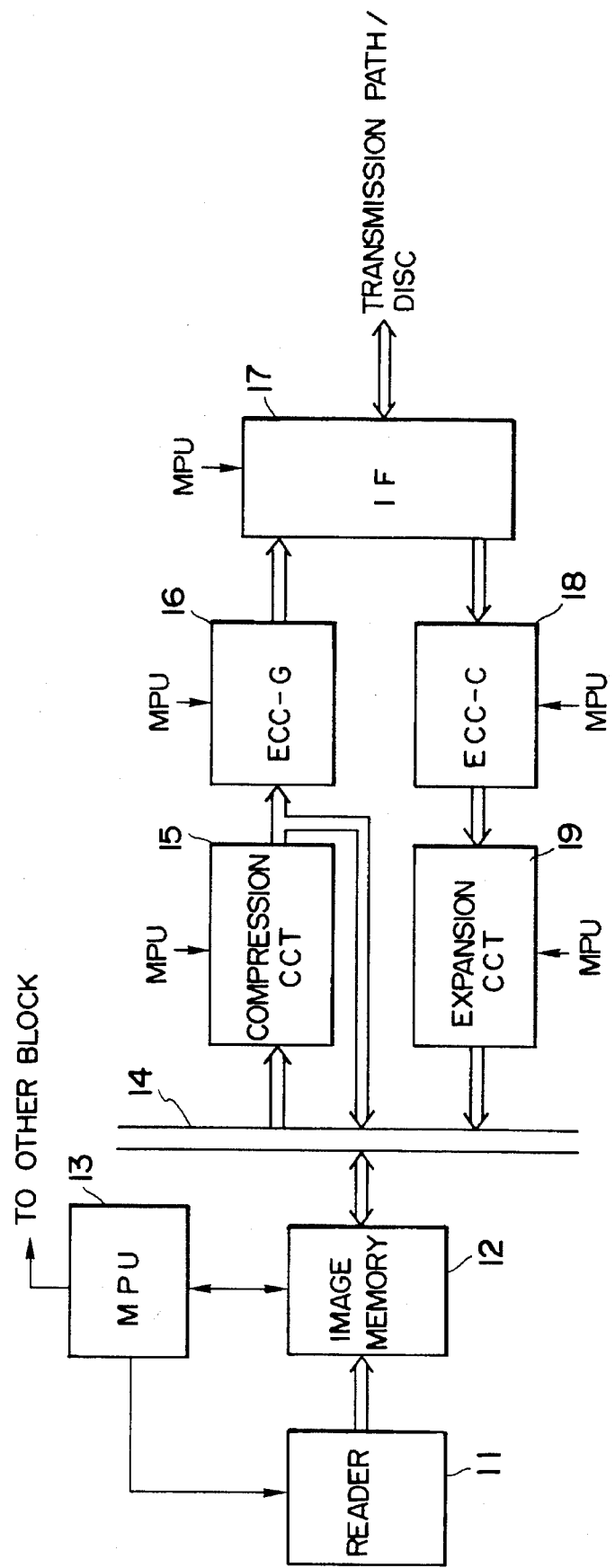

FIG. 2 is a block diagram showing the arrangement of the second embodiment of an image processing system to which the present invention is applied. Circuit blocks effecting the same functions as in the arrangement of FIG. 1 are denoted by the same reference numerals, and a detailed description thereof will be omitted. A difference from the arrangement in FIG. 1 is that in addition to a route through which compressed data output from the compression circuit 15 is supplied to the ECC generator 16, a route for directly supplying the compressed data to the bus 14 is added, so that the compressed data can be stored in the image memory 12.

More specifically, in the arrangement shown in FIG. 2, in order to reliably check whether or not the compression operation of the compression circuit 15 is normal, compressed data from the compression circuit 15 is stored in the image memory 12 without being through other circuit blocks but through the bus 14, and it is checked based on the stored compressed data whether or not the compression operation is normal.

The operation of the image processing system shown in FIG. 2 will be described below.

The MPU 13 shown in FIG. 2 executes operation control shown in FIG. 4 in the same manner as in that shown in FIG. 1. In this case, the content of the diagnostic subroutine in step S3 is different from that in the embodiment shown in FIG. 1.

Figure 6:
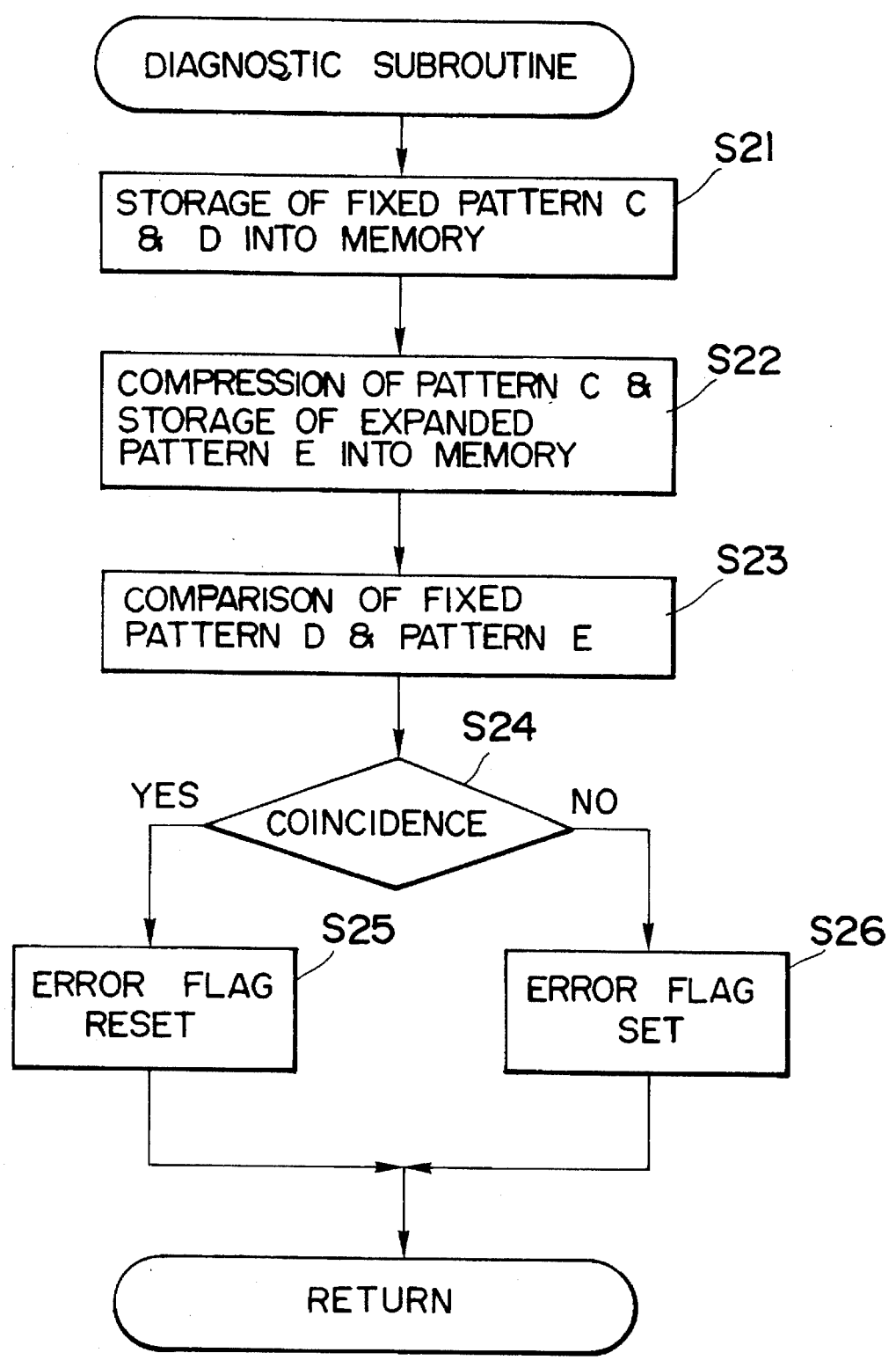

That is, after storage of image data generated from the reader 11 to the image memory 12 is completed, the diagnostic subroutine is called in step S3, as shown in the flow chart of FIG. 6. In step S21, fixed patterns C and D preset in the MPU 13 are stored in first and second diagnostic areas of the image memory 12.

Of the fixed patterns C and D, the fixed pattern C can be the same as the fixed pattern A used in the embodiment shown in FIG. 1, and the fixed pattern D is compressed data to be obtained when the fixed pattern C is compressed by the compression circuit 15.

After the fixed patterns C and D are stored in the first and second diagnostic areas of the image memory 12, the pattern C is read out from the image memory 12 and is supplied to the compression circuit 15 through the bus 14 in step S22. Then, the pattern C is compressed. Compressed data CC obtained by compressing the pattern C is directly supplied from the compression circuit 15 onto the bus 14 without being passed through other circuit blocks, and is stored in a third diagnostic area of the image memory 12 as a pattern E.

After storage of the compressed image data CC in the image memory 12 as the pattern E is completed, the patterns D and E respectively stored in the second and third diagnostic areas are compared by exclusive-ORing corresponding bits, as described above in step S23. If a coincidence between the patterns D and E is found, it can be determined that the compression circuit 15 can execute the compression operation normally.

After the comparison between the patterns D and E is made in step S23, a coincidence or noncoincidence therebetween is discriminated in step S24. If a coincidence is established, the error flag is reset in step S25; otherwise, the error flag is set in step S26. Thus, the diagnostic subroutine is ended, and control returns to the flow chart shown in FIG. 4.

As described above, it is checked by the diagnostic subroutine shown in FIG. 6 if the compression circuit 15 is normal, and the error flag is set or reset in accordance with the check result. Therefore, in step S4 in the flow chart of FIG. 4, the set/reset state of the error flag can be checked to determine whether compression of image data is to be executed or no compression operation is to be and in the latter case a message indicating that a normal operation cannot be executed is displayed.

According to the arrangement of this embodiment as described above, prior to the compression processing of image data generated from the reader 11, it is checked if the compression operation by the compression circuit 15 is normal. If it is determined that the compression operation cannot be normally executed, compression/transmission of image data is prevented. Therefore, erroneously compressed image data can be prevented from being transmitted or stored.

Unlike in the embodiment shown in FIG. 1, abnormality or normality of the compression circuit 15 can be determined.

In the arrangements shown in FIGS. 1 and 2, when compressed image data from the interface 17 is to be transmitted to the electronic file, if a data write/read system for writing/reading to/from the electronic file includes an abnormality, an image read out from the electronic file cannot often be accurately reproduced even if other blocks are normal.

An arrangement of the third embodiment free from the above drawback will be described below.

Figure 3:
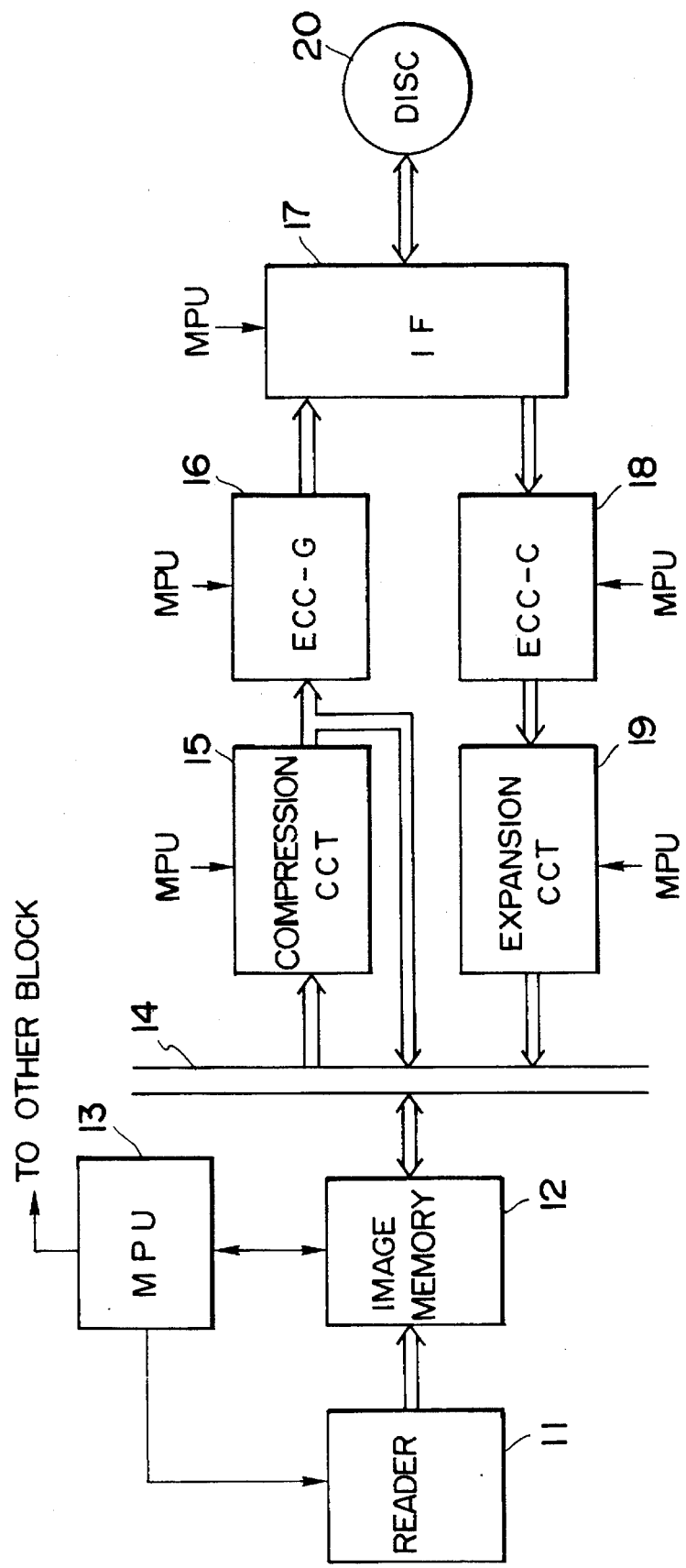

FIG. 3 is a block diagram showing the arrangement of the third embodiment of an image processing system to which the present invention is applied. Circuit blocks effecting the same functions as in the arrangement of FIG. 1 are denoted by the same reference numerals, and a detailed description thereof will be omitted. A difference from the arrangement in FIG. 1 is that the interface 17 is connected to a disc unit 20 as an image electronic file. The disc unit 20 employs a programmable (E-DRAW) optomagnetic disc as a storage medium.

That is, in the arrangement shown in FIG. 3, in order to discriminate whether or not a data transmission route including the compression circuit 15 and the disc unit 20 are normal, compressed data from the compression circuit 15 is stored in the disc unit 20 through the ECC generator 16 and the interface 17.

Thereafter, the compressed data is read out from the disc unit 20, and is supplied to the expansion circuit 19 through the interface 17 and the ECC check circuit 18. Expanded data is stored in the image memory 12 through the bus 14, and normality is discriminated based on the data stored in the image memory 12.

The operation of the image processing system shown in FIG. 3 will be described below.

The MPU 13 shown in FIG. 3 executes operation control as shown in FIG. 4 in the same manner as in that shown in FIG. 1. In this case, the content of the diagnostic subroutine in step S3 is different from that in the embodiment shown in FIG. 1.

Figure 7:
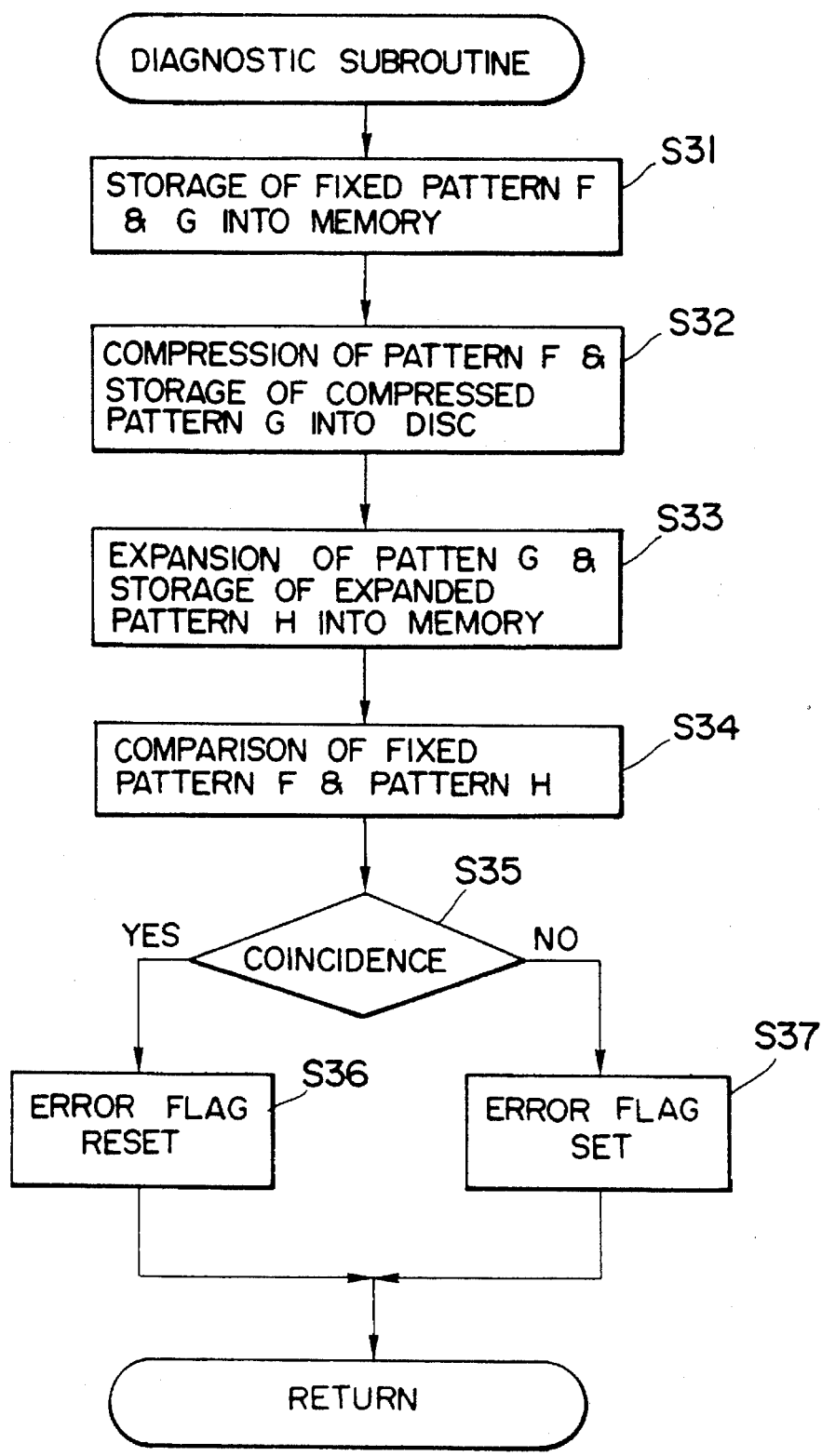

That is, after storage of image data generated from the reader 11 to the image memory 12 is completed, the diagnostic subroutine is called in step S3, as shown in the flow chart of FIG. 7. In step S31, a fixed pattern F preset in the MPU 13 is stored in a first diagnostic area of the image memory 12.

The pattern F can be the same as the fixed pattern A used in the embodiment shown in FIG. 1.

After the fixed pattern F is stored in the first diagnostic area of the image memory 12, the pattern F is read out from the image memory 12 and is supplied to the compression circuit 15 through the bus 14, in step S32. The pattern F is then compressed. Compressed data CF obtained by compressing the pattern F is transmitted to the disc unit 20 through the ECC generator 16 and the interface 17.

A storage area of the programmable disc incorporated in the disc unit 20 is provided with a diagnostic storage area (diagnostic area) as well as a normal image data storage area. The compressed data CF obtained by compressing the pattern F is stored in the diagnostic area as a pattern G.

After the write access of the pattern G in the disc unit 20 is completed, the pattern G is read out from the diagnostic area of the disc in the disc unit 20 and is supplied to the expansion circuit 19 through the interface 17 and the ECC check circuit 18, in step S33. The expansion circuit 19 expands the pattern G, and a pattern H obtained by expansion processing is stored in a second diagnostic area of the image memory 12 through the bus 14.

After storage of the pattern H to the image memory 12 is completed, the patterns F and H respectively stored in the first and second diagnostic areas of the image memory 12 are compared by exclusive-ORing corresponding bits as described above, in step S34.

If coincidence between the patterns F and H is established, it can be determined that the image data processing route including the compression circuit 15 and the disc unit 20 can be normally operated. However, if the patterns F and H do not coincide with each other, it can be determined that the image data processing route is not normally operated. Therefore, the comparison operation allows discrimination as to whether or not the compression operation and storage of compressed data in the disc unit 20 are executed normally.

After the comparison between the patterns F and H is made in step S34, coincidence or noncoincidence therebetween is determined in step S35. If a coincidence is established, the error flag is reset in step S36; otherwise, the error flag is set in step S37. Thus, the diagnostic subroutine is ended, and control returns to the flow chart shown in FIG. 4.

As described above, it can be determined by the diagnostic subroutine shown in FIG. 7 whether or not the compression circuit 15 or the disc unit 20 may be abnormal. In accordance with the determination result, the error flag is set or reset. Therefore, in step S4 in the flow chart shown in FIG. 4, the set/reset state of the error flag is checked to determine whether image data is compressed using the compression circuit 15 and compressed data is stored in the disc unit 20, or no compression and storage operations are performed and a message indicating that an operation cannot be normally executed is displayed.

According to the arrangement of this embodiment as described above, prior to compression and storage processing of image data generated from the reader 11, it is diagnosed if the compression and storage operation can be normally executed. If the compression and storage operations may be abnormal, storage of the image data to the disc unit 20 is prevented. Therefore, erroneous image data can be prevented from being stored.

The arrangements of the first to third embodiments described above can be combined as needed, so that erroneously compressed image data can be reliably prevented from being transmitted or stored and good image processing can be realized.

Note that in each of the above embodiments, compression processing based on the MMR method has been described. However, other compression methods may be adopted. In addition, ECC data is unnecessary if the system is stable.

Image data to be processed may be image data representing an image created by a word processor or a work station in addition to that obtained by reading an original image by the reader.

As described above, since predetermined specific data is compressed to check if the compression operation is normally executed before the compressed image data is transmitted or stored, image data can be prevented from being erroneously compressed and transmitted or stored. Therefore, an operator can be free from the problem of not noticing that compression processing is not being normally executed and that image data is being lost.

In each of the first to third embodiments described above, prior to compression of the image data, compression processing is executed for a diagnostic fixed pattern so as to check whether or not the compression operation can be normally executed.

Next, another arrangement will be described wherein image data compression processing is executed without using a diagnostic fixed pattern, and simultaneously or immediately thereafter, it is checked if the compression operation is normal.

Figure 8:
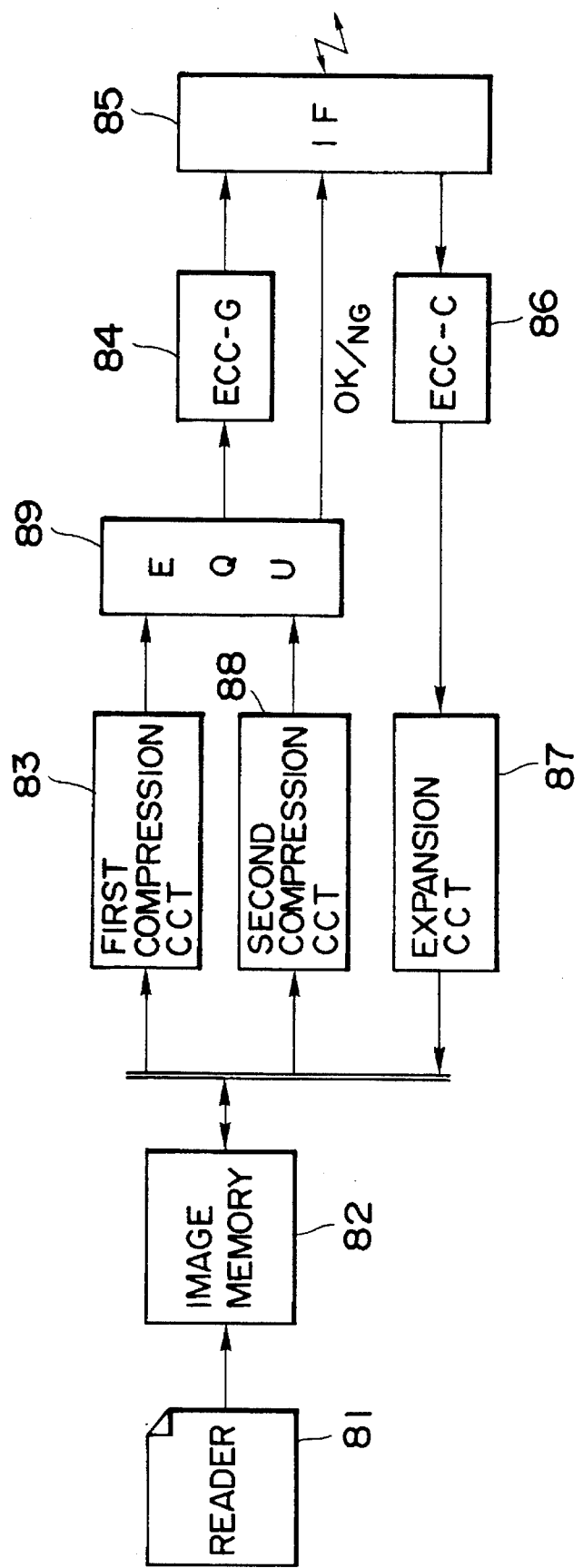
FIGS. 8 and 9 are block diagrams respectively showing arrangements of fourth and fifth embodiments of an image processing system to which the present invention is applied.

FIG. 8 is a block diagram showing a fourth embodiment of an image processing system to which the present invention is applied.

An image reader 81 reads an original using, e.g., a CCD image sensor, and converts the read data into a digital signal and outputs the digital signal. An image memory 82 temporarily stores the digital image data from the image reader 81. As the image memory 82, ones having various capacities corresponding to, e.g., several lines or one to several pages may be used. When the image data is to be displayed or printed, the image data stored in the image memory 82 is read out to be displayed or printed.

First and second compression circuits 83 and 88 are adopted to two-dimensionally compress image data. An ECC circuit 84 adds ECC data to compressed data. An interface 85 is connected to a transmission path or an external storage, and performs I/O control of compressed data added with the ECC data.

An error check circuit 86 is adopted to detect and eliminate an error of the compressed data input from the interface 85 in accordance with the ECC rule. An expansion circuit 87 is adopted to expand compressed data.

When compressed data input from the interface 85 is expanded, the data is error-corrected by the error check circuit 86, and then, image data is obtained by the expansion circuit 87. The resultant image data is held in the image memory 82.

A comparator 89 compares the compressed image data output from the first and second compression circuits 83 and 88 to discriminate a coincidence/noncoincidence therebetween.

The operation of this system will be described below. Image data output from the image reader 81 is held in the image memory 82, and the image data read out from the image memory 82 is simultaneously supplied to the first and second compression circuits 83 and 88 and is compressed thereby in accordance with the identical method. The outputs from the first and second compression circuits 83 and 88 are simultaneously supplied to the comparator 89.

The comparator 89 compares the two systems of input compressed data, and while both the data coincide with each other, outputs the compressed data from the first compression circuit 83 to the interface 85 through the ECC circuit 84. However, if a noncoincidence is detected by the comparator 89, the comparator 89 forwards this information to the interface 85. The interface 85 interrupts outputting of the compressed data, and informs that an error is generated in the compression operation.

With the above processing, an error occurring in the compression processing can be detected prior to expansion, that is, while the image data before being subjected to compression from the image reader 81 is stored in the image memory 82 or an original is still present on the image reader 81 during the compression operation or immediately thereafter. Therefore, identical image data can be retransmitted onto a transmission path or can be restored in a file, thus improving reliability of the system.

In this embodiment, image data from the image reader 81 is compressed. However, the present invention may be applied to a system which compresses image data from a work station or an image file. The compression method is not limited to two-dimensional compression methods, e.g., the MMR method, but other compression methods, e.g., a linear compression method, such as the MH method, may be employed.

According to this embodiment as described above, during compression processing of image data or immediately thereafter, an error in the compression processing can be detected. Therefore, erroneously compressed data can be effectively prevented from being transmitted or stored.

In the fourth embodiment described above, a plurality of compression circuits are necessary since it is discriminated during compression operation of the image data or immediately thereafter whether or not the compression operation is normal. Next, another arrangement will be described wherein the discrimination is performed using an expansion circuit incorporated in the image processing system.

Figure 9:
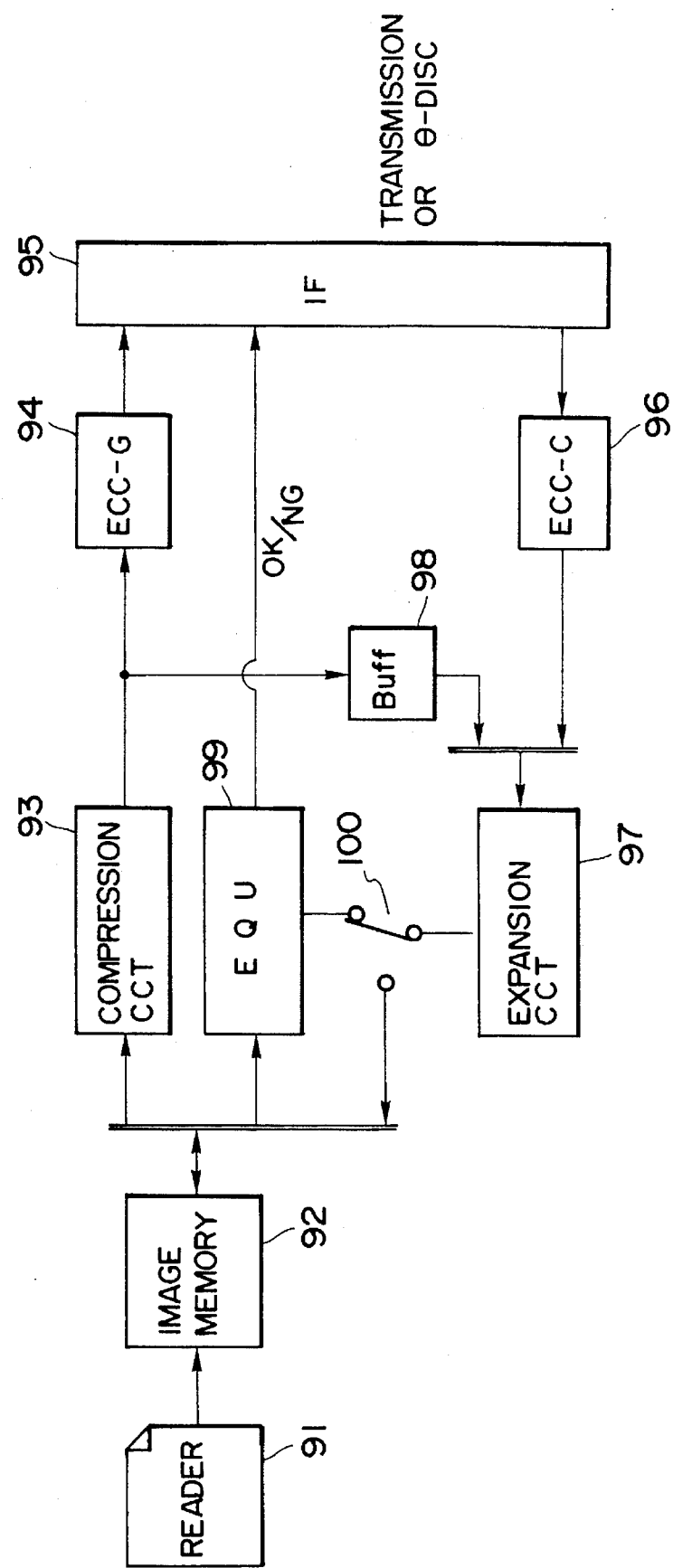

FIG. 9 is a block diagram of a fifth embodiment of an image processing system to which the present invention is applied.

An image reader 91 reads an original using, e.g., a CCD image sensor, and converts the read data into a digital signal and outputs the digital signal. An image memory 92 temporarily stores the digital image data from the image reader 91. As the image memory 92, ones having various capacities corresponding to, e.g., several lines or one to several pages may be used. When the image data is to be displayed or printed, the image data stored in the image memory 92 is read out to be displayed or printed.

A compression circuit 93 is adopted to two-dimensionally compress image data. An ECC circuit 94 adds ECC data to the compressed data. An interface 95 is connected to a transmission path or an external storage, and performs I/O control of the compressed data added with the ECC data.

An error check circuit 96 is adopted to detect and eliminate an error of the compressed data input from the interface 95. An expansion circuit 97 expands the compressed data.

When the compressed data is to be expanded, the data is error-corrected by the error check circuit 96, and is expanded by the expansion circuit 97 to obtain image data.

A buffer 98 is adopted to hold the compressed data output from the compression circuit 93. A comparator 99 compares the non-compressed image data stored in the image memory 92 with the image data expanded by the expansion circuit 97. A switch 100 switches whether the output from the expansion circuit 97 is to be input to the comparator 99 or to the image memory 92.

The operation of this system will be described below. Image data output from the image reader 91 is held in the image memory 92, and the image data read out from the image memory 92 is compressed by the compression circuit 93. The compressed data is output from the interface 95 through the ECC circuit 94, and a predetermined amount of the compressed data is temporarily stored in the buffer 98.

The image data having the same content as the previously compressed data is read out from the image memory 92, and is sent to the comparator 99. At the same time, the compressed data temporarily stored in the buffer 98 is expanded by the expansion circuit 97. The expanded image data is supplied to the comparator 99 through the switch 100.

The comparator 99 compares both the image data. Then, coincidence therebetween is checked for, to determine if the compression processing is normally executed. The comparison result is output as an OK/NG signal to an external apparatus through the interface 95.

When the compression processing is normally executed, the image data sequentially read out from the image memory 92 is compressed by the compression circuit 93, and the compressed data is output to the interface 95 through the ECC circuit 94.

However, when the compression processing is not normally executed, the compression processing is interrupted, and erroneously compressed data is prevented from being output.

With the above processing, an error occurring in the compression processing can be detected prior to expansion, that is, immediately after compression while the non-compressed image data from the image reader is stored in the image memory 92 or an original is still present on the image reader 91. Therefore, identical image data can be retransmitted onto a transmission path or can be restored in a file, thus improving reliability of the system.

In this embodiment, image data from the image reader 91 is compressed. However, the present invention may be applied to a system which compresses image data from a work station or an image file. The compression method is not limited to two-dimensional compression methods, e.g., the MMR method, but other compression methods, e.g., a linear compression method, such as the MH method, may be employed.

According to this embodiment as described above, since a compression processing error can be detected upon compression of image data, erroneously compressed data can be effectively prevented from being transmitted or stored.

Some preferred embodiments of the present invention has been described. However, the present invention is not limited to this, and various changes and modifications may be made within the scope of appended claims.

What is claimed is:

1. An image processing apparatus comprising:
   generating means for generating image data;
   first compression means for compressing image data;
   second compression means for compressing image data by the same method as said first compression means;
   comparing means for comparing a compression result obtained by said first compression means compressing the image data generated by said generating means with a compression result obtained by said second compression means compressing the image data generated by said generating means;
   determining means for determining whether or not a compression operation performed by said first compression means is normal, on the basis of a comparison result of said comparing means;
   output means for outputting data compressed by said first compression means; and
   inhibition means for inhibiting operation of said output means when said determining means determines that the compression operation is abnormal.

2. An apparatus according to claim 1, wherein when said determining means determines that the compression operation is abnormal, compression operations by said first and second compression means are interrupted.

3. An apparatus according to claim 1, wherein said generating means includes reading means for photoelectrically reading an original image to generate the image data according to the original image.

4. An apparatus according to claim 1, wherein said output means outputs the data to an external storage apparatus.

5. An apparatus according to claim 1, wherein said first and second compression means simultaneously output the compression results of the image data generated by said generating means.

6. An image processing apparatus comprising:
   compression means for compressing image data in accordance with a predetermined compression manner;
   first generation means for generating judgment data for use in judging whether or not a compression operation performed by said compression means is normal;
   second generation means in which expected data has previously been set, the expected data being the same as a result of compressing the judgment data according to said predetermined compression manner;
   comparison means for comparing compression data obtained by compression of the judgment data by said compression means with the expected data;
   judgement means for judging whether or not the compression operation performed by said compression means is normal, on the basis of a comparison result obtained by said comparison means; and
   third generation means for generating the image data,
   wherein said judgment means inhibits the compression of the image data generated by said third generation means when said judgment means judges that an abnormality exists in the compression operation.

7. An apparatus according to claim 6, wherein said first generation means includes first storage means for storing the judgment data, and said second generation means includes second storage means for storing the expected data.

8. An apparatus according to claim 7, further comprising third storage means for storing the compression data, and wherein said judgment means performs the judgment operation on the basis of the data stored in said second and third storage means.

9. An apparatus according to claim 6, wherein said third generation means includes read means which photoelectrically reads an original image to generate the image data according to the original image.

10. An apparatus according to claim 6, further comprising:
    output means for outputting the data compressed by said compression means; and
    inhibition means for inhibiting an output operation of said output means during a judgment operation performed by said judgment means.

11. An apparatus according to claim 10, wherein said output means outputs the data to an external storage apparatus.

12. An image processing apparatus comprising:
    compression means for compressing image data in accordance with a predetermined compression manner;
    first generation means for generating judgment data for use in judging whether or not a compression operation performed by said compression means is normal, said first generation means including first storage means for storing the judgment data;
    second generation means in which expected data has previously been set, the expected data being the same as a result of compressing the judgment data according to said predetermined compression manner, said second generation means including second storage means for storing the expected data;
    comparison means for comparing compression data obtained by compression of the judgment data by said compression means with the expected data;
    judgment means for judging whether or not the compression operation performed by said compression means is normal, on the basis of a comparison result obtained by said comparison means; and
    third storage means for storing the compression data,
    wherein said judgment means performs the judgment operation on the basis of the data stored in said second and third storage means.

13. An apparatus according to claim 12, further comprising third generation means for generating the image data, and wherein said judgment means inhibits the compression of the image data generated by said third generation means when said judgment means judges that abnormality exists in the compression operation.

14. An apparatus according to claim 13, wherein said third generation means includes read means which photoelectrically reads an original image to generate the image data according to the original image.

15. An apparatus according to claim 12, further comprising:
output means for outputting the data compressed by said compression means; and
inhibition means for inhibiting an output operation of said output means during a judgment operation performed by said judgment means.

16. An apparatus according to claim 15, wherein said output means outputs the data to an external storage apparatus.

17. An image processing apparatus comprising:
reading means for reading an original image;
compression means for compressing the original image read by said reading means in accordance with a predetermined compression manner; and
judging means for judging whether or not said compression means operates normally,
wherein said judging means includes,
first generation means for generating predetermined image data for judgment, and
second generation means for generating expected data which has previously been set, the expected data being the same as a result of compressing the judgment data in accordance with the predetermined compression manner, and
wherein said judging means judges whether or not said compression means operates normally, on the basis of compression data obtained by compression of the judgment data by said compression means and the expected data.

18. An apparatus according to claim 17, further comprising memory means for storing compressed original image compressed by said compression means.

19. An apparatus according to claim 17, further comprising expansion means for expanding image data.

20. An apparatus according to claim 17, wherein said judging means further comprises inhibition means for inhibiting compression of the original image by said compression means.

21. An image processing apparatus comprising:
compression means for compressing image data in accordance with a predetermined compression manner; and
judging means for judging whether or not said compression means operates normally,
wherein said judging means further comprises:
first generation means for generating predetermined image data for judgment; and
second generation means for generating expected data which has previously been set, the expected data being the same as a result of compressing the judgment data in accordance with the predetermined compression manner, and
wherein said judging means judges whether or not said compression means operates normally, on the basis of compression data obtained by compression of the judgment data by said compression means and the expected data.

22. An apparatus according to claim 21, further comprising memory means for storing a compressed original image compressed by said compression means.

23. An apparatus according to claim 21, further comprising expansion means for expanding the image data.

24. An apparatus according to claim 21, wherein said judging means further comprises inhibition means for inhibiting compression of an original image by said compression means.

25. An apparatus according to claim 21, wherein said compression means compresses the image data read by a reading unit.

26. An image processing method comprising the steps of:
generating image data;
compressing image data in a first compressing step;
compressing image data in a second compressing step by the same method as said first compressing step;
comparing a compression result obtained in the first compressing step with a compression result obtained in the second compressing step;
determining whether or not a compression operation performed in the first compressing step is normal, on the basis of a comparison result in the comparing step;
outputting data compressed in the first compressing step; and
inhibiting the outputting step when in the determining step it is determined that the compression operation is abnormal.

27. A method according to claim 26, including the step of:
interrupting the first and second compressing steps when in the determining step it is determined that the first compressing step is abnormal.

28. A method according to claim 26, wherein said generating step includes the step of:
reading an original image photoelectrically to generate the image data according to the original image.

29. A method according to claim 26, wherein in said outputting step the data is output to an external storage apparatus.

30. A method according to claim 26, wherein in the first and second compressing steps, the respective compression results of the image data generated in the generating step are output simultaneously.

31. An image processing method comprising the steps of:
compressing image data in accordance with a predetermined compression manner;
generating in a first generating step judgment data for use in judging whether or not a compression operation performed in the compressing step is normal;
generating in a second generating step expected data which has previously been set, the expected data being the same as a result of compressing the judgment data according to the predetermined compression manner in the compressing step;
comparing compression data obtained in the compressing step by compression of the image data with the expected data;
judging whether or not the compression operation performed in the compressing step is normal, on the basis of a comparison result obtained in the comparing step; and
generating the image data in a third generating step,
wherein in the judging step the compression of the image data generated in the the third generating step is inhibited when an abnormality exists in the compression operation.

32. A method according to claim 31, wherein the first generating step includes storing the judgment data, and the second generating step includes storing the expected data.

33. A method according to claim 32, including the step of:
    storing the compression data, and in the judging step performing the judgment operation on the basis of the data stored in the first generating step and the second generating step.

34. A method according to claim 31 wherein the third generating step includes the step of:
    reading an original image photoelectrically to generate the image data according to the original image.

35. A method according to claim 31, including the steps of:
    outputting the data compressed in the compressing step; and
    inhibiting an output operation of the outputting step during a judgment operation performed during the judging step.

36. A method according to claim 31, wherein in the outputting step, the data is output to an external storage apparatus.

37. An image processing method comprising the steps of:
    compressing image data in accordance with a predetermined compression manner; and
    judging whether or not the compression operation performed in the compressing step is normal,
    wherein the judging step includes the steps of:
        generating in a first generating step predetermined image data for judgment; and
        generating in a second generating step expected data which has previously been set, the expected data being the same as a result of compressing the judgment data in accordance with the predetermined compression manner in the compressing step, and
    wherein the judging step judges whether or not the compression operation performed in the compressing step is normal, on the basis of compression data obtained by compression of the judgment data in the compressing step and the expected data.

38. A method according to claim 37, including the step of:
    storing a compressed original image compressed in the compressing step.

39. A method according to claim 37, including the step of:
    expanding the image data.

40. A method according to claim 37, wherein said judging step includes the step of:
    inhibiting compression of an original image in the compressing step.

41. A method according to claim 37, wherein in said compressing step image data read by a reading unit is compressed.

* * * * *

UNITED STATES PATENT AND TRADEMARK OFFICE
CERTIFICATE OF CORRECTION

PATENT NO. : 5,463,700
DATED : October 31, 1995
INVENTOR(S) : TAMOTSU NAKAZAWA

It is certified that error appears in the above-indentified patent and that said Letters Patent is hereby corrected as shown below:

ON THE TITLE PAGE:
[56] References Cited

U.S. PATENT DOCUMENTS, "4,153,916  5/1979  Mina et al." should read --4,153,916  5/1976  Miwa et al.--; and "4,695,895  9/1987  Naga Shima" should read --4,695,895  9/1987  Nagashima--.

IN THE DRAWINGS

Sheet 7, Fig. 7, "PATTEN G" should read --PATTERN G--.

COLUMN 11

Line 19, "has" should read --have--.

COLUMN 15

Line 11, "claim 31" should read --claim 31,--.

Signed and Sealed this

Fourteenth Day of May, 1996

Attest:

BRUCE LEHMAN

Attesting Officer    Commissioner of Patents and Trademarks